(12) United States Patent
Chadwick et al.

(10) Patent No.: US 10,374,235 B2
(45) Date of Patent: Aug. 6, 2019

(54) SYSTEM AND METHOD FOR IMPROVING POWER PRODUCTION IN LINEAR ARRAY BENTHIC MICROBIAL FUEL CELLS

(71) Applicant: The United States of America as represented by the Secretary of the Navy, Washington, DC (US)

(72) Inventors: David B. Chadwick, San Diego, CA (US); Yolanda Meriah Arias-Thode, San Diego, CA (US); Andrew Higier, San Diego, CA (US); Lewis Hsu, San Diego, CA (US); Kenneth E. Richter, San Diego, CA (US); Alex G. Phipps, San Diego, CA (US); Gregory W. Anderson, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 53 days.

(21) Appl. No.: 15/716,433

(22) Filed: Sep. 26, 2017

(65) Prior Publication Data
US 2018/0097237 A1  Apr. 5, 2018

Related U.S. Application Data

(60) Provisional application No. 62/403,683, filed on Oct. 3, 2016.

(51) Int. Cl.
*H01M 4/86* (2006.01)
*H01M 4/88* (2006.01)
(Continued)

(52) U.S. Cl.
CPC .......... *H01M 4/8657* (2013.01); *H01M 4/88* (2013.01); *H01M 4/96* (2013.01); *H01M 8/004* (2013.01); *H01M 8/0206* (2013.01); *H01M 8/08* (2013.01); *H01M 8/16* (2013.01); *H01M 2250/10* (2013.01); *Y02B 90/14* (2013.01); *Y02E 60/527* (2013.01)

(58) Field of Classification Search
CPC .................................................. H01M 4/8657
See application file for complete search history.

(56) References Cited

U.S. PATENT DOCUMENTS

| 6,913,854 | B1 | 7/2005 | Alberte et al. | |
| 7,807,303 | B2 * | 10/2010 | Swift | H01M 4/90 |
| | | | | 429/2 |

(Continued)

*Primary Examiner* — Sarah A. Slifka
*Assistant Examiner* — Brian R. Ohara
(74) *Attorney, Agent, or Firm* — Naval Information Warfare Center Pacific; Kyle Eppele

(57) ABSTRACT

A method for improving power production comprising the steps of providing an existing linear array benthic microbial fuel cell system having an anode and a plurality of cathodes, wherein the anode is an insulated underwater cable buried beneath seafloor sediment, and wherein the plurality of cathodes are configured to be buoyant and to rise above the sea floor, wrapping the insulated underwater cable with carbon fiber bundles and a current collector, wherein the carbon fiber is coated with a binder, securing the carbon fiber bundles and current collector with a web of synthetic fiber, fraying the carbon fiber bundles, creating exposed carbon ends on the cable and removing the binder.

2 Claims, 3 Drawing Sheets

(51) Int. Cl.
*H01M 4/96* (2006.01)
*H01M 8/00* (2016.01)
*H01M 8/02* (2016.01)
*H01M 8/08* (2016.01)
*H01M 8/16* (2006.01)
*H01M 8/0206* (2016.01)

(56) References Cited

U.S. PATENT DOCUMENTS

| | | |
|---|---|---|
| 8,012,616 B2 | 9/2011 | Tender |
| 8,148,019 B2 | 4/2012 | Tender |
| 8,430,601 B1 | 4/2013 | Chadwick et al. |
| 8,715,867 B1 * | 5/2014 | McNeilly ............. H01M 8/16 |
| | | 429/2 |
| 8,916,299 B1 | 12/2014 | Liu et al. |

* cited by examiner

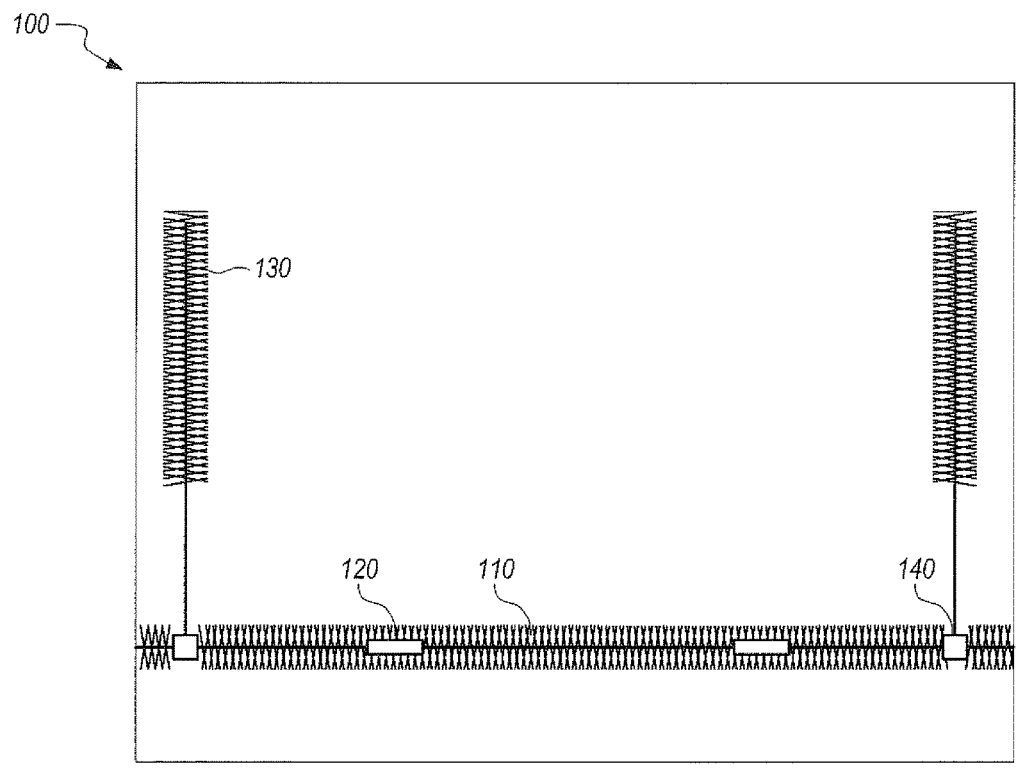
FIG. 1
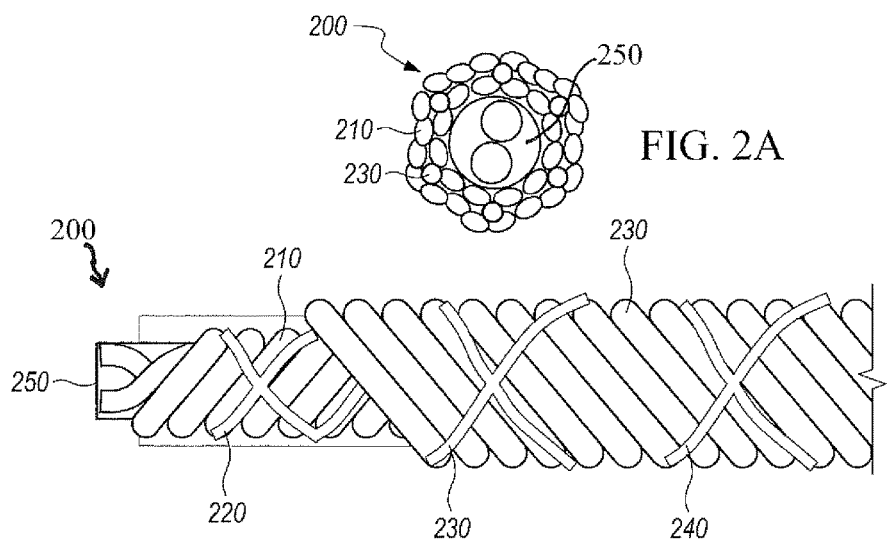
FIG. 2A
FIG. 2B

SYSTEM AND METHOD FOR IMPROVING POWER PRODUCTION IN LINEAR ARRAY BENTHIC MICROBIAL FUEL CELLS

CROSS-REFERENCE TO RELATED APPLICATION

This document is a nonprovisional patent application, claiming the benefit of, and priority to, U.S. Provisional Patent Application Ser. No. 62/403,683, entitled "Linear-Array Benthic Microbial Fuel Cell," filed on Oct. 3, 2016, which is hereby incorporated by reference in its entirety.

FEDERALLY-SPONSORED RESEARCH AND DEVELOPMENT

Linear Array Benthic Microbial Fuel Cell System and Methods is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case Number 103564.

BACKGROUND

Access to renewable energy on the seafloor is limited due to the lack of sunlight, high water flows, thermal gradients, and other traditional avenues of renewable energy extraction. Long term intelligence, surveillance, and reconnaissance (ISR) systems are required to be placed on or under the seafloor to provide information for operational, security, environmental, resource management, communications and other applications. Many of these systems are buried into the seafloor to operate properly or to avoid being fouled by fishing gear and anchors. In addition, these systems often have a short lifetime and need to be repeatedly deployed which leads to extremely high cost of operation.

One such system is a Linear Array BMFC (LA-BMFC), which utilizes the physical structure of an existing buried underwater cable or array to form the sediment fuel cell electrode. Thus rather than engineering and deploying a completely separate energy system to power the seafloor system, the BMFC is built as part of the linear array to form a single integrated unit, and the fuel cell system is deployed with the array just as the array would normally be deployed. In a typical linear array seafloor sensor system, sensors are connected by and separated by lengths of cable that provide power and telemetry for the sensors. The number of sensors and the length of cables vary by application. In the LA-BMFC, these lengths of cable are jacketed with carbon fabric which serve as the anodes for the fuel cell. At various lengths along the cable, small electronics modules connect to cathodes that protrude slightly into the surface water and harvest energy which is then transferred directly onto the linear array power cables. The cathodes for these systems incorporate a buoyant core so that as the system is deployed they stay clear of the seafloor while the remaining portions of the array are fully buried. The approach is applicable to a broad range of configurations and applications.

Advances in BMFC system design have increased feasibility for its use in ocean monitoring, and have been used for powering underwater sensors and communications devices on the seafloor over extended periods of time. However most of these applications have been for demonstration purposes only and integration with operational underwater systems such as a linear array is still an ongoing challenge.

BRIEF DESCRIPTION OF THE DRAWINGS

FIG. 1 shows a side view of a diagram of the linear array-benthic microbial fuel cell (LA-BMFC) integration with a buried sensor array.

FIG. 2A shows a cross-section view of the carbon cable construction in accordance with the LA BMFC.

FIG. 2B shows a side view of the carbon cable construction in accordance with the LA BMFC.

DETAILED DESCRIPTION OF SOME EMBODIMENTS

Figure 3A:
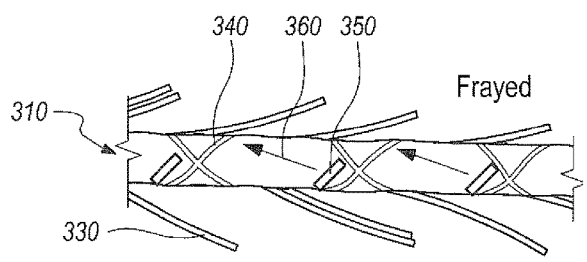
FIG. 3A shows a top view of a frayed carbon cable.

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

FIG. 1 shows a diagram of a basic linear array benthic microbial fuel cell (LA-BMFC) 100 located on a seafloor. LA-BMFC 100 has a length of insulated underwater carbon cable 110 wrapped with carbon fiber bundles, an appropriate current collector, and secured by a web of the synthetic fiber (all of which are not specifically shown in FIG. 1). Carbon cable 110 acts as the anode, is easy to handle on reels, and can transmit power along underwater carbon cable 110. Sensor nodes 120 monitor and report environmental parameters as well as human/animal activities in a marine environment.

LA-BMFC 100 uses carbon sheathing on carbon cable 110, together with incremental cathodes 130 that protrude slightly into the surface water and electronics modules 140, to harvest sea floor energy and transfer it to power hydrophone elements along LA-BMFC 100. Cathodes 130 incorporate a buoyant core so that as LA-BMFC 100 is deployed, they stay clear of the seafloor while the remaining portions of LA-BMFC 100 are fully buried. LA-BMFC 100 forms a single integrated unit, and the fuel cell system is deployed with the array just as the array would normally be deployed. In a typical linear array seafloor sensor system, sensors are connected by and separated by lengths of cable that provide power and telemetry for the sensors. The number of sensors and the length of the cables vary by application.

LA-BMFC systems can be directly integrated with linear-array sensor systems and seafloor cables requiring no additional engineering or deployment effort. Many of the cables are very long, so there is plenty of electrode surface area to generate energy. The cathodes are buoyant and thus will self-deploy into the water column. The flexibility of the cathodes and lack of loops will prevent fouling by fishing gear or anchors. Finally, the harvested energy can be transferred directly to the power conductors of the linear array sensor system.

BMFCs are constructed of fabric panels or brush-type carbon electrodes because of their durability during deployment. It was previously shown that BMFCs in the same sediments using carbon fabric panels generated power densities of approximately 10-20 mW/m2 in an anode-limited setup. The expected power density was experimentally verified for a 1:8 aspect ratio at surface areas ~0.01 m2. For linear forms of BMFCs, length is the appropriate scale factor instead of surface area. On a linear basis at a 1:8 aspect ratio and a surface area of 0.01 m2, ~20 mW/m2 becomes ~0.7 mW/m. Thus, linear BMFCs should meet or exceed ~0.7 mW/m to be competitive with carbon fabric panels.

FIGS. 2A-2B show a diagram of a carbon cable 200. FIG. 2A shows a cross-section view of carbon cable 200, and FIG. 2B shows a side view of carbon cable 200. Carbon cable 200 is used to make the anodes for LA-BMFC 100 (as shown in FIG. 1). Carbon cable 200 has an inner layer 210 of carbon yarn covered by a titanium wire mesh 220, in turn covered by an outer layer of carbon yarn 230, which was held in place by synthetic fiber wrap 240. Carbon yarn 230 is coated with a binder mixture (not shown) consisting of polyvinyl alcohol (PVA), food-grade starch, and a proprietary fatty alcohol mixture. The innermost layer of carbon cable 200 is an insulated copper wire bundle 250.

Figure 3B:
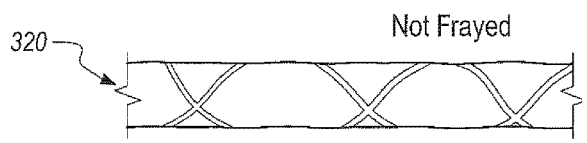
FIG. 3B shows a top view of an unfrayed carbon cable.

FIG. 3A shows a top view of anode 300 having a carbon cable 310 that is frayed. FIG. 3B shows a top view of anode 300 having a carbon cable 320 that is not frayed. Power output of carbon cables is improved by removing some of the synthetic binders used in the manufacturing process and introducing frayed fiber ends to the carbon cables that increase the footprint of anodes.

The process of fraying cable anodes involves exposing short strands of the carbon yarn 330 as shown in FIG. 3A. To do this, mini scissors are used to cut two adjacent strands of carbon yarn 330 taking care not to cut synthetic fiber wrap 340. As shown in FIG. 3A, the cut 350 was made preceding each crossover on the synthetic fiber wrap 340. The exposed ends of carbon yarn 330 are carefully pulled back in the direction of arrow 360 and under synthetic fiber wrap 340. When cuts 350 are made, exposed ends 330 are approximately one inch long with one inch spacing along cable anode 300.

Figure 4A:
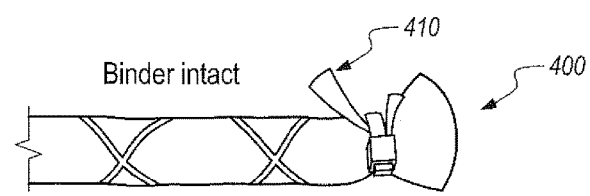
FIG. 4A shows a top view of a carbon cable with the binder intact.
Figure 4B:
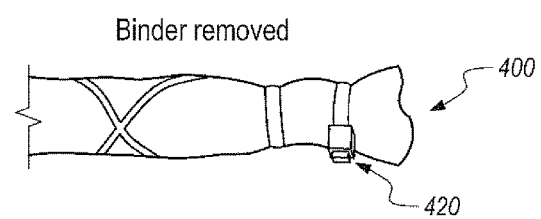
FIG. 4B shows a top view of a carbon cable with the binder removed.

FIG. 4A shows a top view of anode 400 with the binder intact. FIG. 4B shows a top view of anode 400 having the binder removed. Removing the binder requires heating anode 400 in water to 80-90° C. To seal off the wire bundle 250 inside carbon cable 200 (as seen in FIGS. 2A-2B), outer carbon layer 230 on each end is peeled back to better expose the wire bundle cut end. Then wire bundles 250 are sealed at the cut ends with a sealant, taking care not to seal carbon layer 230 to the wire bundle 250 to prevent wicking of moisture into wire bundle 250. Carbon layer 230 was secured in place at one end of each carbon cable 200 segment using tie-wraps 260 after the sealant had dried overnight. Anode 400 is submerged with diH2O and placed in a large container (ends covered in plastic and not submerged). Water is heated to approximately 60° C.-95° C.; and that temperature range is maintained for 5 hours and then turned off. Anode 400 is left overnight in the water. The procedure is repeated two times; with a diH2O rinse post soaking. Anode 400 is then removed from the water and squeezed with paper towels to remove excess water. To dry completely, anode 400 is placed in a fume hood in an upright position. Upon completion, carbon layer 230 is softer and more pliable than the untreated version. The result is an anode surface visibly distinct from the untreated anode. FIG. 4 shows a more metallic luster on anode 420 after binder removal.

Connecting titanium wire for the cable anodes are cut to approximately 140 cm lengths and the insulation was stripped from a 3 cm length at one end of each segment. To attach the wires, the stripped end of each connector was inserted underneath the titanium wire mesh, making contact with several (2-3) of the individual wires in the mesh of each of the cable segments. Several tie-wraps were used to hold the connecting wire and carbon layer firmly in place.

Figure 5A:
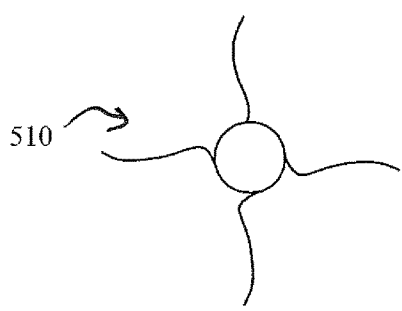
FIG. 5A-5C show various embodiments of cables wrapped with different configurations of carbon.
Figure 5B:
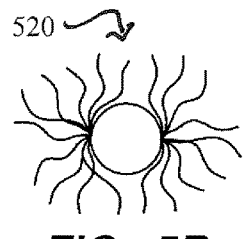
Figure 5C:
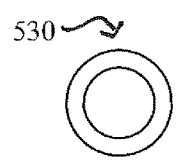

FIGS. 5A-5C show various embodiments of cables wrapped with different configurations of carbon. To increase the surface area of the cable allowing for more power, the carbon can be configured in different ways. FIG. 5A shows a cable 510 having a carbon flap; essentially 2 pieces of carbon cloth (fabric) stitched together at right angles; with a titanium wire in the middle, sewn around the cable. Then, an additional 1 meter ×4 inch fabric cloth is sewn down the middle, resulting in four individual two inch 'flaps.' This configuration is challenging to-reproduce however. FIG. 5B shows a cable 520 having a commercially available carbon fiber brush with carbon fibers throughout and tested as an alternate configuration. FIG. 5C shows a cable 530 that spools carbon cloth around the cable and then a titanium mesh is used to keep them together. A second layer of carbon is then added on top and a mesh cloth is used to keep it together and prevent un-spooling. This is referred to as a wrap configuration.

Figure 6:
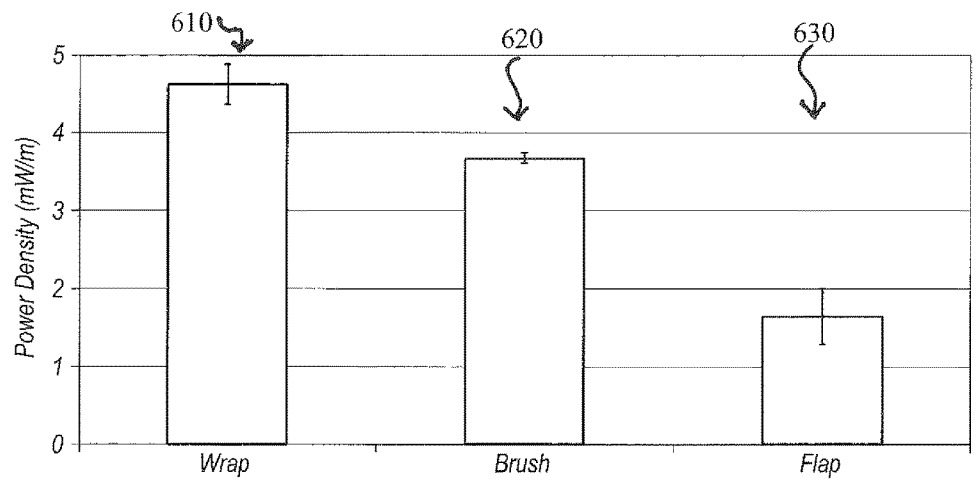
FIG. 6 shows results from lab tests showing power density from three different configurations of carbon cables.

FIG. 6 shows the different power densities from the three different configurations in FIGS. 5A-5C. Bar graph 610 shows the power density from the wrap configuration. Bar graph 620 shows the power density from the brush configuration. Bar graph 630 shows the power density from the flap configuration. The data from bar graph 610 shows that the carbon cloth in the wrap configuration produced the most power out of the three configurations.

Power generation of two types of cable anodes were tested in duplicate for over 25 days in an anode-limited BMFC. A pair of cable anodes used as-is (untreated) with the Binder intact and another pair of cable anodes that were treated in the heated bath. Binder removal resulted in a mass loss of 1.49±0.02 g (n=3), which was 8.3% of the original mass. Untreated anodes showed a two-peak power response at day 6 and day 9 followed by a consistently poor power density output of 0.18 mW/m at the end of 26 days of operation. The treated anodes responded in the typical growth response for BMFCs reaching a power density of 1.57 and 1.94 mW/m. At peak, untreated anodes performed at only 54% of the average steady power of the treated anodes. At steady performance, that percentage drops to only 11%, which proves that the Binder had an overall negative effect on anode performance.

In a separate experiment, the effect of fraying was tested on anode-limited BMFCs. Similar to the Binder removal experiment, two sets of duplicate cable anodes were prepared with one set frayed and the second set not frayed. Frayed cable anodes reached power densities of 1.48 and 1.33 mW/m after 47 days of BMFC operation. On average, fraying produced 8.3× more power over the unfrayed cable anodes, which produced 0.21 and 0.13 mW/m after 47 days of BMFC operation. The end of experiment power output for both controls were consistent, which was expected because all four anodes were used untreated.

Figure 7:
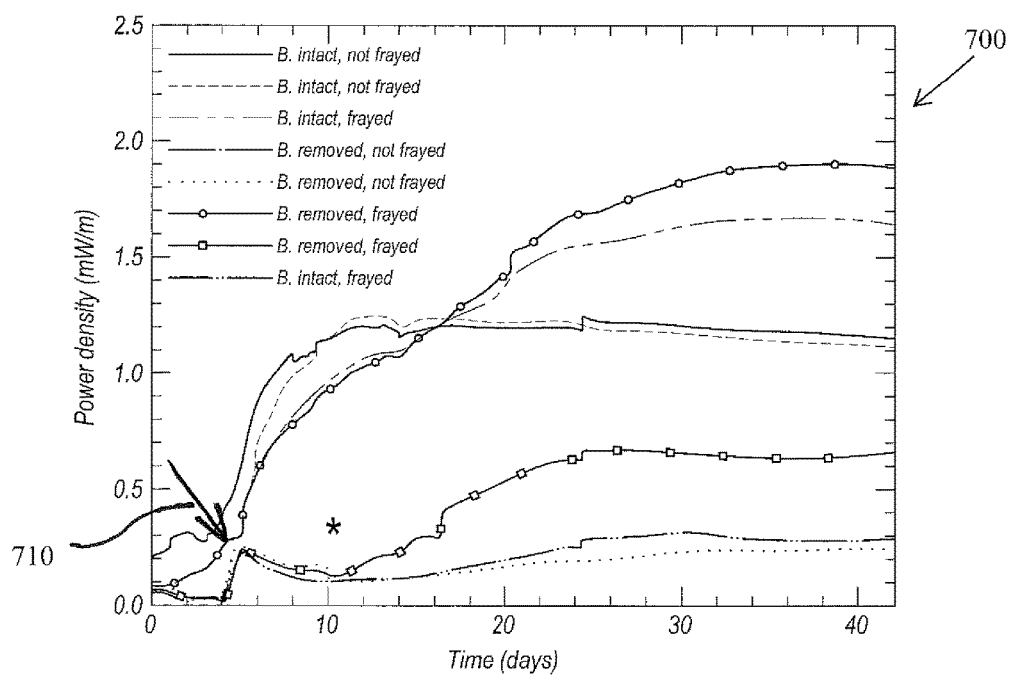
FIG. 7 shows a graph of power generation of BMFCs combining the binder removal and fraying treatments at various treatment levels.

FIG. 7 shows a graph 700 of power generation of eight BMFCs operating over 42 days combining the binder removal and fraying treatments at various treatment levels. First, indicated by arrow 710, all four cable anodes showed nearly identical peaks consistent with the Binder left intact. One critical conclusion is that binder removal speeds up the onset of power generation. Additionally, the fraying treatment improved the steady power output by 0.4 mW/m with the binder intact and 0.7 mW/m with the binder removed. However, fraying always had a positive effect on power generation.

Both binder removal and fraying have a net positive effect on power generation by BMFCs studied here. Used as-is, the cable anodes perform poorly against our benchmark of ~0.7 mW/m. Operating at 30% of the benchmark is not acceptable. Factoring in either treatment, however, improves the cable anode performance and makes it competitive with the carbon fabric panels. Within the context of the comparison between fabric panel anodes and cable anodes, there is merit in considering the linear form as it bypasses most of the deployment issue related to fabric panel anodes.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system for improving power production comprising:
    a linear array benthic microbial fuel cell system having an anode and a plurality of cathodes, wherein the anode is an insulated underwater cable buried beneath seafloor sediment, and wherein a plurality of sensors are connected by and separated by the cable, and wherein the plurality of cathodes are configured to be buoyant and to rise above the sea floor, and wherein a plurality of electronics modules are electrically coupled to the plurality of cathodes;
    wherein the insulated underwater cable comprises an insulated wire bundle covered with an inner layer of carbon yarn, the inner layer of carbon yarn covered by a titanium wire mesh, the titanium wire mesh then covered by an outer layer of carbon yarn, the outer layer of carbon yarn held in place by a web of synthetic filament.
2. The system of claim 1, wherein the wire bundle is an insulated Copper wire bundle.

* * * * *